Patented Mar. 19, 1946

2,397,004

UNITED STATES PATENT OFFICE 2,397,004

GLASS ENAMEL COMPOSITION

Carl J. Harbert, Shaker Heights, Francis C. Ellinger, East Cleveland, and William C. Morris, South Euclid, Ohio, assignors to The Harshaw Chemical Company, Elyria, Ohio, a corporation of Ohio No Drawing. Application July 22, 1944, Serial No. 546,210

14 Claims. (Cl. 106—49)

This invention relates to low fusing enamels of superior alkali resistance suitable for application to glass, and to glass articles having such enamels applied thereon.

Prior to our invention it has been known to incorporate titania and zirconia in an enamel of this type for securing acid and alkali resistance. U. S. Patent No. 2,225,159 teaches that titania will impart acid resistance to these enamels. U. S. Patent No. 2,278,868 teaches that zirconia will impart alkali resistance. U. S. Patent No. 2,312,788 discloses glass enamels containing both titania and zirconia and claims excellent resistance to acid, alkalies and sulfides. We have experimented with these compositions and have found that the use of titania and zirconia do give good resistance to acids and alkalies respectively, but not as good as might be desired, particularly in respect to gloss and initial attack by alkalies. We have noted that when samples of such enamels are boiled in 10% caustic soda, the attack as measured by loss of spectral gloss (determined on the Hunter reflectometer) is initially rapid, the curve flattening out after the first hour.

We have now discovered that by the use of certain rare earth oxides, or rare earth compounds capable of yielding the oxides during smelting, either singly or mixtures thereof, we are able to produce glass enamels of much improved alkali resistance as shown by slow loss of spectral gloss and longer life in boiling caustic solution. The rare earths referred to are lanthanum, praesodymium, neodymium and thorium. As indicated above, the oxides of these rare earths, or compounds capable of yielding the oxides during smelting, may be added to the smelter batch. Where a single rare earth oxide is to be employed, the preferable one is lanthanum, although the others are quite satisfactory. Various mixtures are quite satisfactory, for example, didymium, which is a commercially obtainable mixture of neodymium and praesodymium. Cerium is definitely harmful and should not be used deliberately, although a small amount can be tolerated and is sometimes more or less unavoidable since it is often present to some extent as an impurity in the desired materials. A very practical mixture for our purpose is the residue of monazite after the cerium and phosphate have been removed. A typical analysis of such a monazite residue would be about as follows:

| | Parts by weight |
|---|---|
| Thorium oxide | 9.5 |
| Praesodymium oxide | 5.0 |
| Neodymium oxide | 10.0 |
| Lanthanum oxide | 15.0 |

Such a residue would normally contain small amounts of cerium and $P_2O_5$ as impurities, but these should, for best results, be as low as practicable, cerium calculated as $CeO_2$ being kept below 1% and preferably below ½%, and phosphorus calculated as $P_2O_5$ being kept below ½%, preferably below ¼%.

The enamel compositions of the invention are essentially low fusing (not above 640° C.) lead borosilicate glazes containing when desired special additions for special functions and all containing one or more rare earth oxides of the group consisting of lanthanum, praesodymium, neodymium and thorium.

Suitable composition ranges, on the analytical basis, i. e. theoretical melted composition, are as follows: Lead oxide 40 to 60 per cent, silica 22 to 32 per cent, boric oxide 3 to 12 per cent, titania 0 to 5 per cent, preferably 2 to 4 per cent, soda 3 to 7 per cent, preferably about 5 per cent, barium oxide 0 to 6 per cent, preferably 1 to 5 per cent, cadmium oxide 0 to 5 per cent, and one or more rare earth oxides from 0.5 to 10 per cent, preferably 2 to 6 per cent. Percentages and proportions are by weight based on the weight of the frit and exclusive of added pigments or indifferent materials. These percentages may be based upon the combined weight of the materials named when it is more convenient since the result usually is approximately the same.

By referring to composition ranges on the analytical basis or to melted compositions, we intend to indicate that the constituent oxides will be found on analysis in those proportions, but we do not intend to indicate the kind of physical or chemical association which may exist in the glaze itself.

In the following table, we have indicated several examples of smelter batch compositions and the resulting theoretical melted compositions.

| | Sample number | | | |
|---|---|---|---|---|
| | 1 | 2 | 3 | 4 |
| SMELTER BATCH (PARTS BY WEIGHT) | | | | |
| Sodium silicate [1] | 10.60 | 11.10 | 11.10 | 10.60 |
| Titansil [2] | 5.60 | 5.80 | 5.90 | 5.60 |
| Lead borate | 18.70 | 23.00 | 15.80 | 18.70 |
| Lead monosilicate | 36.10 | 33.30 | 42.00 | 36.10 |
| Zinc oxide | 0.90 | 1.00 | 1.00 | 0.90 |
| Cadmium hydrate | 2.70 | 3.00 | 2.70 | 2.70 |
| Silica | 15.00 | 16.50 | 14.30 | 15.00 |
| Barium carbonate | 3.70 | 0.20 | 0.18 | 3.70 |
| Barium fluoride | 2.70 | 2.10 | 2.12 | 2.70 |
| Monazite residue (monazite less cerium and phosphate) | 4.00 | | | |
| Didymium oxide | | 4.00 | | |
| Neodymium carbonate | | | 5.00 | |
| Lanthanum oxide | | | | 4.00 |
| THEORETICAL MELTED COMPOSITION (PARTS BY WEIGHT) | | | | |
| $Na_2O$ | 4.00 | 4.15 | 4.25 | 4.00 |
| BaO | 5.49 | 2.05 | 2.15 | 5.49 |
| PbO | 46.10 | 46.90 | 49.20 | 46.10 |
| ZnO | 0.90 | 1.00 | 0.95 | 0.90 |
| CdO | 2.35 | 2.70 | 2.50 | 2.35 |
| $B_2O_3$ | 4.46 | 5.40 | 3.75 | 4.46 |
| $SiO_2$ | 30.80 | 31.80 | 31.50 | 30.80 |
| $TiO_2$ | 1.80 | 1.90 | 1.95 | 1.80 |
| Didymium oxide | | 4.10 | | |
| $Nd_2O_3$ | | | 3.75 | |
| $La_2O_3$ | | | | 4.10 |
| Rare earth oxides (from monazite residue) | 4.10 | | | |

[1] $Na_2O$—25%; $SiO_2$—75% by weight.
[2] $TiO_2$—32%; $SiO_2$—24%; $Na_2O$—25%; $CO_2$—19% by weight.

These examples are merely representative of many compositions possible according to the invention. Lead borosilicate is the fundamental basis of the enamel which may contain various proportions of the oxides of lead, sodium, barium, boron and silicon according to desired maturing temperature, coefficient of expansion, etc., all of which is understood by persons skilled in the art. Fluorides of barium, sodium, etc. may be used in the batch and in such cases, the resulting glaze will contain fluorine. Titania functions to improve acid resistance and the amount is not critical. If acid resistance is not essential, titania can be omitted. Cadmium oxide is present in these examples to condition the frit for use of a cadmium color to be introduced as a mill addition.

As with most frit compositions there are a number of variations possible depending largely on usage of the material. The BaO content can be varied rather widely from 0 to 6 per cent or higher, but due to its influence on viscosity it is usually best at 1 to 5 per cent. Also, the $B_2O_3$ can be varied over a wide range, but in the work on the rare earth oxides it has been found usually desirable to keep it within the range of 3½% to 6½%, if too low, there is a tendency for the enamel to be hard, if too high, the alkali resistance suffers.

The ingredients of the batch are smelted sufficiently to produce a clear melt which is then fritted in the usual manner and is ready to be ground with suitable mill additions in the preparations of the enamel. The most important mill additions are, of course, pigments either white or colored. Normally we make up the batch such as indicated in the examples, melt it to a clear melt, frit it into water and then grind the frit with the pigment and other usual mill additions. It is possible, of course, to add some pigments in the batch, that is, as smelter additions, but we prefer to add them at the mill. The pigment selected should be such that when the enamel is applied to glass and fused on the pigment particles do not melt. Thus the enamel consists of pigment particles dispersed in a melted glaze matrix of the compositions indicated above.

Having thus described our invention, what we claim is:

1. A lead borosilicate glaze composition suitable for decorating glassware, having a fusing temperature not higher than 640° C. and exhibiting superior alkali resistance, said glaze composition comprising a lead borosilicate type of glaze composition and also containing a material of the class consisting of the oxides of thorium, praesodymium, neodymium and lanthanum and mixtures thereof, the amount of cerium and phosphate impurities present in said composition, calculated as $CeO_2$ and $P_2O_5$, being less than 1% and ½% respectively of the weight of said material.

2. A lead borosilicate glaze suitable for decorating glassware, having a fusing temperature not higher than 640° C. and exhibiting superior alkali resistance, said glaze comprising a pigment dispersed in a glaze matrix of lead borosilicate type and said matrix containing as smelted in addition for imparting high alkali resistance a material of the class consisting of the oxides of thorium, praesodymium, neodymium and lanthanum, and mixtures thereof, in proportion from ½% to 10% by weight, the amount of cerium and phosphate impurities present in said composition, calculated as $CeO_2$ and $P_2O_5$, being less than 1% and ½% respectively of the weight of said material.

3. A lead borosilicate glaze suitable for decorating glassware, having a fusing temperature not higher than 640° C. and exhibiting superior alkali resistance, said glaze comprising a pigment dispersed in a glaze matrix of lead borosilicate type and said matrix containing as smelted in addition for imparting high alkali resistance a material of the class consisting of the oxides of thorium, praesodymium, neodymium and lanthanum, and mixtures thereof, in proportion from 2% to 6% by weight, the amount of cerium and phosphate impurities present in said composition, calculated as $CeO_2$ and $P_2O_5$, being less than 1% and ½% respectively of the weight of said material.

4. A glass article having at least a portion of its surface coated with the glaze defined in claim 2.

5. A lead borosilicate glaze of low melting point suitable for decorating glassware and exhibiting high resistance to alkalies, said glaze comprising a pigment dispersed in a melted matrix, said matrix containing, on the analytical basis, the oxides of lead, silicon, sodium and boron and also a material of the class consisting of the oxides of thorium, praesodymium, neodymium and lanthanum, and mixtures thereof, said material consistuting from ½% to 10% of the glaze by weight, the amount of cerium and phosphate impurities present in said composition, calculated as $CeO_2$ and $P_2O_5$, being less than 1% and ½% respectively of the weight of said material.

6. A lead borosilicate glaze of low melting point suitable for decorating glassware and exhibiting high resistance to alkalies, said glaze comprising a pigment dispersed in a melted matrix, said matrix containing, on the analytical basis, the oxides of lead, silicon, sodium and boron and from ½% to 10% by weight of monazite residue.

7. A lead borosilicate glaze of low melting point suitable for decorating glassware and exhibiting high resistance to alkalies, said glaze comprising a pigment dispersed in a melted matrix, said matrix containing, on the analytical basis, the oxides of lead, silicon, sodium and boron and also a material of the class consisting of the oxides of thorium, praesodymium, neodymium and lanthanum, and mixtures thereof, said material constituting from 2% to 6% of the glaze by weight, the amount of cerium and phosphate impurities present in said composition, calculated as $CeO_2$ and $P_2O_5$, being less than 1% and ½% respectively of the weight of said material.

8. A lead borosilicate glaze of low melting point suitable for decorating glassware and exhibiting high resistance to alkalies, said glaze comprising a pigment dispersed in a melted matrix, said matrix containing, on the analytical basis, the oxides of lead, silicon, sodium and boron and also containing from 2% to 6% of monazite residue.

9. A lead borosilicate glaze of low melting point suitable for application to glass and comprising a pigment and a melted glaze matrix, said matrix being on the analytical basis composed of the following oxides in approximately the proportions indicated:

| | |
|---|---|
| PbO | parts by weight 40 to 60 |
| $Na_2O$ | do 3 to 7 |
| BaO | do 0 to 6 |
| $SiO_2$ | do 22 to 32 |
| $B_2O_3$ | do 3 to 12 |
| $TiO_2$ | do 0 to 5 |
| Monazite residue | per cent ½ to 10 |

10. A lead borosilicate glaze of low melting point suitable for application to glass and comprising a pigment and a melted glaze matrix, said matrix being on the analytical basis composed of the following oxides in approximately the proportions indicated:

| | |
|---|---|
| PbO | parts by weight 40 to 60 |
| $Na_2O$ | do 3 to 7 |
| BaO | do 1 to 5 |
| $SiO_2$ | do 22 to 32 |
| $B_2O_3$ | do 3 to 12 |
| $TiO_2$ | do 0 to 5 |
| Monazite residue | per cent 2 to 6 |

11. A lead borosilicate glaze of low melting point suitable for application to glass and comprising a pigment and a melted glaze matrix, said matrix being on the analytical basis composed of the following oxides in approximately the proportions indicated:

| | Parts by weight |
|---|---|
| PbO | 40 to 60 |
| $Na_2O$ | 3 to 7 |
| BaO | 0 to 6 |
| $SiO_2$ | 22 to 32 |
| $B_2O_3$ | 3 to 12 |
| $TiO_2$ | 0 to 5 |
| Lanthanum oxide | ½ to 8 per cent, | and containing less than 1% cerium oxide and less than ½% phosphate calculated as $CeO_2$ and $P_2O_5$ respectively based upon the weight of lanthanum oxide.

12. A glass article having at least a portion of its surface coated with the glaze defined in claim 9.

13. A method of making a glaze composition which includes the steps of smelting together to produce a clear melt, a batch containing a substance of the class consisting of the oxides of thorium, praesodymium, neodymium, lanthanum, mixtures thereof, and materials capable of yielding:

| | Parts by weight |
|---|---|
| PbO | 40 to 60 |
| $Na_2O$ | 3 to 7 |
| BaO | 0 to 6 |
| $SiO_2$ | 22 to 32 |
| $B_2O_3$ | 3 to 12 | said substance being present in proportion from ½% to 10% of the total weight of said materials, the amount of cerium and phosphate impurities present in said composition, calculated as $CeO_2$ and $P_2O_5$, being less than 1% and ½% respectively of the weight of said substance.

14. A process of making an alkali resistance glaze comprising smelting a batch containing rare earth oxy-compounds capable of yielding on analysis from ½% to 10% of rare earth oxides, based on the weight of the resulting frit; a barium composition of the class consisting of barium fluoride, barium carbonate, barium hydrate, barium oxide and mixtures thereof in proportion from 1% to 5% when calculated as BaO and based on the weight of the resulting frit; and materials capable of yielding:

| | |
|---|---|
| PbO | 40 to 60 parts by weight |
| $Na_2O$ | 3 to 7 parts by weight |
| $SiO_2$ | 22 to 32 parts by weight |
| $B_2O_3$ | 3 to 12 parts by weight, | cerium and phosphate impurities in said batch being such that in the resulting frit they will be present to the extent of less than 1% $CeO_2$ and ½% $P_2O_5$ respectively based upon the weight of rare earth oxides in said frit.

CARL J. HARBERT.
FRANCIS C. ELLINGER.
WILLIAM C. MORRIS.